United States Patent
Conley et al.

[15] 3,640,387
[45] Feb. 8, 1972

[54] REMOVAL OF FLOC FROM SETTLING DEVICE

[72] Inventors: Walter R. Conley; Gordon L. Culp, both of Corvallis, Oreg.

[73] Assignee: Neptune Microfloc, Incorporated, Corvallis, Oreg.

[22] Filed: Dec. 15, 1969

[21] Appl. No.: 884,908

[52] U.S. Cl. .................................. 210/73, 210/83, 210/521
[51] Int. Cl. .................................................. B01d 21/02
[58] Field of Search .................. 210/63, 73, 83, 84, 511, 522, 210/523, 525, 527, 196

[56] References Cited

UNITED STATES PATENTS

| 1,960,686 | 5/1934 | Tumim .............................. 210/523 X |
| 3,482,694 | 12/1969 | Rice et al. ........................ 210/84 X |
| 3,506,125 | 4/1970 | Willis et al. ......................... 210/73 |
| 3,529,728 | 9/1970 | Minjelbeek et al. ................ 210/522 |

*Primary Examiner*—John Adee
*Attorney*—Buckhorn, Blore, Klarquist & Sparkman

[57] ABSTRACT

Floc buildup on top edges of inclined tube settling device prevented by causing slight flow of liquid across tops of tubes.

4 Claims, 4 Drawing Figures

PATENTED FEB 8 1972 3,640,387

WALTER R. CONLEY
GORDON L. CULP
INVENTORS.

BY
BUCKHORN, BLORE, KLARQUIST & SPARKMAN
ATTORNEYS

3,640,387

REMOVAL OF FLOC FROM SETTLING DEVICE

BACKGROUND OF THE INVENTION

In the treatment of waste liquids, such as sewage or industrial waste, or in the clarification of water wherein large floc volumes are formed, it is convenient to remove large proportions of the settleable materials upwardly at a slow velocity through tubes inclined at a large acute angle to the horizontal. If the liquid is maintained at a laminar flow rate, efficient removal of the solid material takes place in the tubes and the substantially clarified water is discharged from the tops of the tubes for further treatment or disposal. An example of modules of tubes for effecting such liquid treatment is shown in pending U.S. application Ser. no. 721,250, filed Apr. 15, 1968.

It has been found in the operation of such devices that on occasion a buildup of floc sometime occurs on the upper edges of the tubes, particularly where the liquid being treated contains a sticky floc such as in formed in alum treatment of water. While not seemingly affecting in any way the quality of the effluent, such buildup is at least aesthetically not desirable and, of course, there is always the possibility that if the buildup becomes too large in amount, portions of the floc could break away and float downstream. If a large mass of the floc should be removed at one time, it conceivably could adversely affect some operation downstream from the settling device.

BRIEF DESCRIPTION OF THE INVENTION

We have the that if a current of liquid is caused to flow across the top of the tubes of a settling device that a buildup of floc is prevented. While a continuous current is most desirable, intermittent flow appears to prevent the buildup provided the periods between flow are not too long.

DRAWINGS

DESCRIPTION OF THE INVENTION

Figure 1:
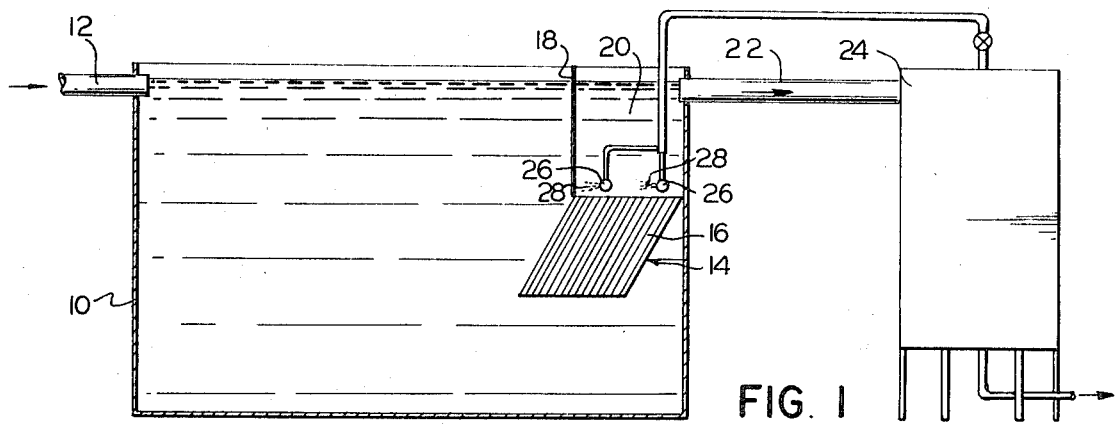
FIG. 1 is a schematic elevation of a portion of a clarification system constructed in accordance with the invention.

With reference to FIG. 1, there is indicated therein a basin 10 which may be, for example, an aeration basin for treating sewage and to which basin the liquid to be treated is introduced through a conduit 12.

Mounted in the basin 10 so that it will be immersed in the liquid contained therein is a module 14 of settling tubes arranged so that the tubes (indicated at 16) subtend a large acute angle, i.e., between 45° and 75°, with respect to the horizontal. The module 14 is so arranged that the effluent from the tops of the tubes 16 is isolated from the remainder of the basin 10, such as by a wall 18 defining a clearwell 20 over the top of the module. The clarified liquid is withdrawn from the clearwell 20 by a conduit 22 and may, for example, be passed through a filter 24.

In accordance with the invention means are provided to create a flow of liquid across the tops of the tubes 16. In the embodiment illustrated at FIG. 1, a pair of headers 26 is mounted immediately above the tops of the tubes 16, with outlets positioned so that when liquid is supplied to the headers, jets 28 are directed in a horizontal direction above the tops of the tubes, and which jets will, of course, induce a general current flow across the tops of the tubes. The liquid introduced to the headers 26 may be provided in any suitable manner. The headers 26 may be arranged to receive the backwash water from the filter 24. When so connected, the solids collecting in the filter will be returned to the basin 10 so that accumulating solids may eventually be withdrawn solely from the basin 10. If it is desired to create a continuous current of water over the tops of the tubes 16, the backwash water from the filters 24 could be diverted to a holding tank and water withdrawn from such tank at the desired rate is fed to the header 26. Water from any other suitable source can, of course, be connected to the headers 26.

When a module is cleansed intermittently with consequent dislodging of accumulated floc, it may be desirable to wait a short period after dislodging the floc before restarting operation so as to permit the floc to settle into the tubes 16.

In a typical installation, headers may be spaced at 10 to 20 foot intervals with ⅛-inch holes on 12-inch centers, and the headers should be fed at a pressure of at least about 15 pounds per square inch.

Figure 2:
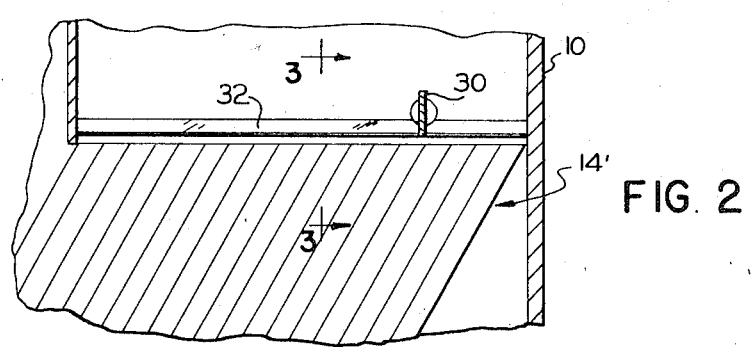
FIG. 2 is an enlarged fragmentary section illustrating a modification of the invention.
Figure 3:
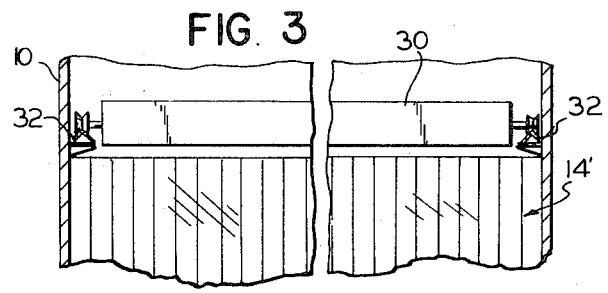
FIG. 3 is a cross-sectional view taken along line 3—3 of FIG. 2.

Referring to FIGS. 2 and 3, an alternative arrangement in creating a current across a module is illustrated comprising a baffle 30 mounted over the module 14' for movement across the module. The baffle 30 is supported at its opposite ends in tracks 32 mounted in the walls of the basin 10 and suitable means (not shown) are provided for causing the baffle to reciprocate across the module. As it moves, the baffle will create the desired current of liquid to prevent formation of or dislodge any formed floc deposits. While the necessary current velocities to prevent floc accumulation or dislodge it will necessarily vary, depending upon the nature of the flock, for a typical alum floc a continuous flow rate across the top of a module of about one-half foot per second is sufficient. In intermittent operation a somewhat greater flow rate may be desirable to dislodge the flock, say, about 1 foot per second. Also, the frequency of intermittent flows will depend upon the nature of the floc and can best be determined by observation and experience.

Figure 4:
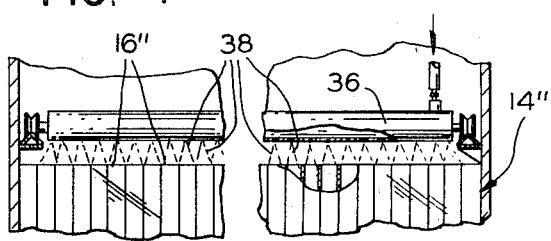
FIG. 4 is a cross-sectional view of another modification.

In FIG. 4 is shown still another arrangement wherein a header 36 is mounted over a module 14'' for movement horizontally across the top of a module. The header 36 is provided with outlets in its lower surface so as to direct jets 38 of water downwardly toward the top of the module. Such jets will extend into the top portions of the tubes 16'' to dislodge any material which may deposit therein, and, thus, while having greater mechanical complexity than fixed headers, the present embodiment may have operational advantages in effecting the removal of additional amounts of floc.

Having described certain preferred embodiments, it should be apparent that the invention can be modified in arrangement and detail.

What is claimed is:

1. In a process for removing settleable materials from a liquid in a settling basin wherein said liquid and materials are caused to flow upwardly through a module of tubes inclined to the horizontal at a large acute angle, said module being immersed in said liquid, said liquid flowing into a clearwell at the top of said module and thence through a filter, said materials settling out in said tubes of said module, the method of preventing accumulation of nonliquid materials at the top of said module comprising
causing a current of backwash water from said filter to flow parallel to the upper surface of said module and across the tops of said tubes therein,
wherein deposits are dislodged from said tops of said tubes and solid materials collecting in said filter and returned to said basin so that all of said solid materials in said liquid are withdrawn solely from said basin.

2. The method of claim 1 wherein said current of backwash water is continuous.

3. The method of claim 1 wherein said current of backwash water is intermittent.

4. The method of claim 1 wherein said current of backwash water is caused to move across said tops of said tubes at a velocity in excess of one-half foot per second.

* * * * *

UNITED STATES PATENT OFFICE
CERTIFICATE OF CORRECTION

Patent No. 3,640,387          Dated March 27, 1972

Inventor(s) Walter R. Conley and Gordon L. Culp

It is certified that error appears in the above-identified patent and that said Letters Patent are hereby corrected as shown below:

Column 1, line 7, after "materials" insert --from the liquid by passing the liquid and settleable materials--.

Column 1, line 19, change "in" before formed to --is--.

Column 1, line 29, after "have" omit "the" and insert --discovered--.

Column 2, line 60, change "wherein" to --whereby--.

Column 2, line 61, change "and", second occurrence, to -- are --.

Signed and sealed this 11th day of July 1972.

(SEAL)
Attest:

EDWARD M. FLETCHER, JR.        ROBERT GOTTSCHALK
Attesting Officer              Commissioner of Patents